US007943879B2

(12) United States Patent
Bayer

(10) Patent No.: US 7,943,879 B2

(45) Date of Patent: May 17, 2011

(54) METHOD FOR SORTING UNADDRESSED MAIL ITEMS

(75) Inventor: Thomas Bayer, Radolfzell (DE)

(73) Assignee: Siemens Aktiengesellschaft, Munich (DE)

( * ) Notice: Subject to any disclaimer, the term of this patent is extended or adjusted under 35 U.S.C. 154(b) by 550 days.

(21) Appl. No.: 11/628,142

(22) PCT Filed: Aug. 11, 2006

(86) PCT No.: PCT/EP2006/007941

§ 371 (c)(1), (2), (4) Date: Jan. 24, 2008

(87) PCT Pub. No.: WO2007/022879

PCT Pub. Date: Mar. 1, 2007

(65) Prior Publication Data

US 2008/0264835 A1 Oct. 30, 2008

(30) Foreign Application Priority Data

Aug. 26, 2005 (DE) ........................ 10 2005 040 664

(51) Int. Cl.
*B07C 5/00* (2006.01)
*G06K 9/00* (2006.01)

(52) U.S. Cl. ......... 209/584; 209/900; 382/101; 700/223

(58) Field of Classification Search .................. 209/583, 209/584, 900; 382/101, 102; 700/223–226
See application file for complete search history.

(56) References Cited

U.S. PATENT DOCUMENTS

| | | | | |
|---|---|---|---|---|
| 5,311,999 | A * | 5/1994 | Malow et al. | 209/583 |
| 6,169,936 | B1 | 1/2001 | Lohmann | |
| 6,239,397 | B1 | 5/2001 | Rosenbaum et al. | |
| 6,466,336 | B1 * | 10/2002 | Sturgeon et al. | 358/444 |
| 6,665,422 | B1 * | 12/2003 | Seidel et al. | 382/101 |
| 6,888,084 | B1 | 5/2005 | Bayer | |
| 6,996,276 | B2 * | 2/2006 | Liu et al. | 382/218 |
| 2005/0123170 | A1 * | 6/2005 | Desprez et al. | 382/101 |
| 2006/0228040 | A1 * | 10/2006 | Simon et al. | 382/254 |
| 2009/0050541 | A1 * | 2/2009 | Berdelle-Hilge | 209/584 |
| 2010/0111356 | A1 * | 5/2010 | Berger et al. | 382/101 |

FOREIGN PATENT DOCUMENTS

| | | | |
|---|---|---|---|
| CN | 1152265 | A | 6/1997 |
| CN | 1230137 | A | 9/1999 |
| EP | 1 389 493 | A | 2/2004 |
| FR | 2729589 | A1 | 7/1996 |
| WO | 0123108 | A1 | 4/2001 |

OTHER PUBLICATIONS

Derwent Abstract—EP-1 389 493 A; Feb. 18, 2004; MIT Management intelligenter Technologien GmbH, D-52076 Achen, Germany.

* cited by examiner

*Primary Examiner* — Joseph C Rodriguez

(74) *Attorney, Agent, or Firm* — Laurence A. Greenberg; Werner H. Stemer; Ralph E. Locher

(57) ABSTRACT

In a method for sorting mail items which are unaddressed and held in a number of batches each batch is obtained and registered by recording at least one graphical feature of a mail item which uniquely describes the batch (i.e. clearly identifies the batch from other batches). The graphical reference feature is linked to a batch of unaddressed mail and an associated sorting plan. In a subsequent sorting of all batches, each batch is recorded once again and its reference feature is detected and it is distributed according to the sorting plan, if necessary to an end delivery point.

8 Claims, No Drawings

METHOD FOR SORTING UNADDRESSED MAIL ITEMS

BACKGROUND OF THE INVENTION

The invention relates to a method for sorting unaddressed mail items.

Promotional mail represents an ever greater volume of mail which must be integrated into the daily flow of regular addressed mail. Previously this mail flow was handled in parallel to the regular addressed mail flow but this made it expensive to process at a sorting office.

In addition the senders/creators of this promotional mail wish to target their customers specifically. In particular they do not wish to send this promotional mail to every household, but only to selected households, and they want to set the time of delivery of this mail to a particular day.

This imposes new demands on the postal service for the sorting process (e.g. sorting into delivery routes): Sorting one or more batches of unaddressed mail to specific known delivery points at a specific point in time. As a rule the different batches of unaddressed mail will be delivered to different numbers of delivery points; thus for example promotional mail about items for small children is likely to be distributed to entirely different delivery points (households) from promotional mail about equestrian sports items.

Especially when this batch of promotional mail items is to be delivered to households on a specific day, the postal service is confronted with the challenge of organizing this process efficiently.

SUMMARY OF THE INVENTION

The underlying object of the invention is to specify an efficient method for sorting unaddressed mail items.

Accordingly, in a method for sorting mail items which are unaddressed and held in a number of batches each batch is obtained and registered by recording at least one graphical feature of a mail item which uniquely describes the batch (i.e. clearly identifies the batch from other batches).

The graphical reference feature is linked to a batch of unaddressed mail and an associated sorting plan.

In a subsequent sorting of all batches, each batch is recorded once again and its reference feature is detected and it is distributed according to the sorting plan, if necessary to an end delivery point.

Advantageous embodiments of the invention are set down in the subclaims.

DETAILED DESCRIPTION OF THE INVENTION

In this case the different batches of promotional mail to be delivered at a particular time are first detected by a small quantity of examples of each batch being recorded. 10 electronic images are thus available for each batch for example. From this volume a pictorial representative is now determined by taking an average value of the 10 images for example. This representative forms precisely the pictorial reference feature.

The reference feature is also determined by recording images of a number of mail items stored in the batch, preferably by averaging recorded areas of identical mail items of a batch. These areas can comprise pictures or promotional texts, this does not affect the basic invention in any way.

The recording is undertaken using a digital means such as a scanner, preferably by means of binary, gray-level or color-level coding values. The selection of these configuration options is governed by the graphical aspect of the promotional mail items in the batch. The advantage of binary encoding is the minimal memory space that it requires. This also allows an electronic link between reference feature and a specific batch of promotional mail items to be established and stored in a registration database, from which it can be retrieved.

In the mail sorting process the batch is now fed into the sorting machine at a specific time. Images of these mail items are now compared with all reference features or representatives. A decision is made in such cases as to the batch of promotional items from which the mail item currently to be sorted originates, as with a fingerprint-based recognition method. According to the sorting plan linked to the representative, each of these detected mail items can now be sorted to the correct delivery point (household).

The advantage lies in enabling any batch of unaddressed mail to be explicitly delivered to households in accordance with the sender's stipulations and allowing this process to be seamlessly integrated into the normal mail sorting process without any additional manual operations being required.

A further advantage is that, for registration of the different batches, an automatic check can be made as to how well the representatives can be distinguished, making its very simple to distinguish between examples of different batches in the subsequent recognition process. If too great a similarity is (automatically) established, the user can support the identification task manually by actually marking different areas of the similar representatives.

A number of examples of a batch which are needed for sorting can also be displayed. In more general terms, a knowledge of the reference feature combined with the batch simplifies and accelerates the sorting logistics for delivery of the batch.

Furthermore the link between the pictorial reference feature and a delivery point can be retrieved remotely. This means that the reference feature can for example be transmitted and retrieved remotely from a sorting office in order to check the delivery destination of a batch held there. A particular advantage is that a batch can always be identified, from the sorting office right through to the point of delivery.

The invention claimed is:

1. A method for sorting unaddressed mail items stored in a number of batches, the method comprising:
   - providing a number of the batches, each of the batches being defined by respective identical unaddressed mail items;
   - registering each batch by recording at least one pictorial reference feature of at least one of the mail items belonging to the respective batch,
   - linking the pictorial reference feature to a sorting plan,
   - detecting the pictorial reference feature on the unaddressed mail items during a subsequent sorting of all the unaddressed mail items of all the batches; and
   - distributing the unaddressed mail items in accordance with the sorting plan linked to the detected pictorial reference features.

2. The method of claim 1, wherein the reference feature is determined from images of a number of mail items held in the batch.

3. The method of claim 1, wherein a number of examples of a batch which are required for a sorting are displayed.

4. The method of claim 1, wherein a link between the pictorial reference feature and a delivery point is retrieved remotely.

5. The method of claim 1, wherein the reference feature is determined from images of a number of mail items held in the batch by averaging recorded areas of identical mail items of a batch.

6. The method of claim 1, wherein the images are recorded digitally using binary grey-coded of color-level coding values.

7. A method for sorting unaddressed mail items stored in a number of batches, the method comprising:

registering each batch by recording at least one pictorial reference feature of a mail item;

linking the pictorial reference feature to a sorting plan, and in a subsequent sorting of all batches, recording each batch again, detecting reference features, and distributing in accordance with the sorting plan;

determining the reference feature from images of a number of mail items held in the batch by averaging recorded areas of identical mail items of a batch.

8. A method for sorting unaddressed mail items stored in a number of batches, each batch defined by identical unaddressed mail items therein, the method comprising the steps of:

for each of the batches, recording at least one pictorial reference feature of at least one mail item which belongs to the respective batch, linking the pictorial reference feature to a sorting plan, and during a subsequent sorting of all unaddressed mail items of all batches, detecting the pictorial reference features on the unaddressed mail items and distributing the unaddressed mail items in accordance with the sorting plan linked to the pictorial reference features that have been detected on the unaddressed mail items.

* * * * *